Jan. 10, 1950     C. A. FEATHER     2,494,039

FRICTIONAL INCREASING DEVICE OF MOTOR VEHICLES

Filed Nov. 20, 1947

Charles A. Feather
INVENTOR.

BY Ralph Donath
Attorney

Patented Jan. 10, 1950

2,494,039

UNITED STATES PATENT OFFICE 2,494,039

FRICTIONAL INCREASING DEVICE OF MOTOR VEHICLES

Charles A. Feather, Pittsburgh, Pa.

Application November 20, 1947, Serial No. 787,176

2 Claims. (Cl. 188—4)

This invention pertains to road friction increasing devices for motor vehicles and has as its object to prevent lateral skidding as well as rotary sliding of the wheels on the road.

As is well known, a vehicle will skid when the lateral components of the acting forces become greater than the frictional resistance of the wheel against lateral motion. The main causes of skidding are centrifugal forces (when the vehicle is executing a turn) or unequalized braking forces (when the vehicle is being decelerated by applying the brakes). Rotary sliding occurs generally when starting and the frictional resistance between wheel tires and road is decreased by moisture, oil, mud, ice, snow etc. The causes bringing about rotary sliding contribute also to skidding. The driver of the car generally becomes aware of the danger of skidding and sliding as soon as it starts and has time to counteract it somewhat by conventional means such as by slowing down, releasing of the brakes, etc.

My present invention gives the operator additional, instantaneous and efficient instrumentality to prevent skidding and sliding by providing resilient drag members which he may apply in time with suitable pressure acting, first as sweepers on the tire treads cleaning off adhering matter and then acting between the vehicle and the road; these members are by lateral motion slidable but not rollable, increasing thereby considerably the frictional resistance between vehicle and road, hence, are arresting, or preventing the skidding. The same members, by first cleaning the treads of the wheels from adhering matter restore substantially the original surface qualities thereof and prevent or reduce rotary sliding.

Hence, one object of the invention is to provide a friction increasing device consisting of drag members shaped as cylindrical bodies rotatably mounted in the space bounded by the vertical planes tangential to the sides of the wheel tires of the vehicle and positioned within the same spaces by an operable rigging that applies with sufficient force the drag members first to the tread of the tires of the vehicle wheels and afterwards to the road.

Another object of the invention is to provide a friction increasing device which employs rubber cylinders or rollers rotatably mounted on resilient levers and operatively connected to a driver controlled rigging for bringing the rollers in frictional contact first with the vehicle tires and then with the road.

Yet another object of the invention is to provide a device of the character described which applies rubber rollers, having friction increasing treads on their periphery, first to the tread of the vehicle tires and then to the road.

Another object of the invention is to provide a device of the type set forth in which the rollers of substantially resilient material act first as rotating sweepers upon the tires of the vehicle and then as drag members upon the road which members are not rotatable by lateral motion resisting thereby lateral or sidewise motion of the vehicle on the road.

Other objects and purposes will be clearly recognized by those versed in the art by perusing the following description and the accompanying drawing in which.

Same parts are designated by the same numerals throughout the several views of the drawing.

Figure 1:
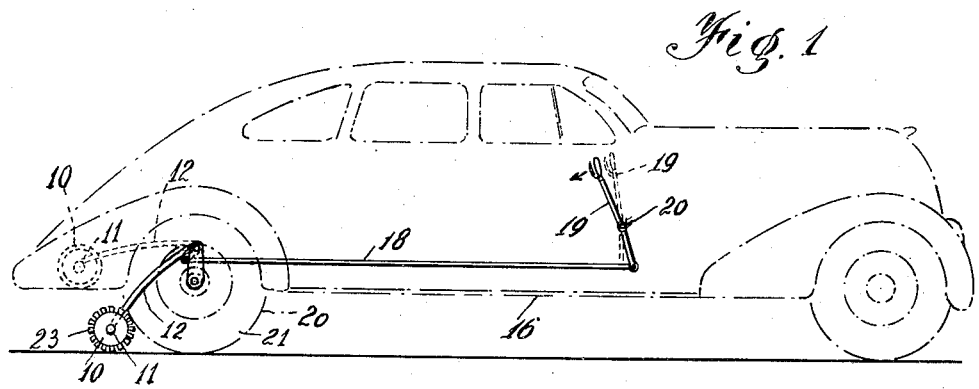
Figure 1 is a general elevational view of the preferred embodiment of the invention shown mounted on a car, the outline of the latter being indicated in dot and dash lines.

Referring now to the drawing, 10 indicates the drag members shaped preferably as cylinders or rollers made substantially from resilient material such as rubber, and rotatably mounted on journals 11 that are integral with, or rigidly fastened to, lever arms 12 fixed rigidly to rocker shaft 13 which is oscillatably mounted in brackets 14, rigidly fixed to the rear axle 15 of the vehicle 16. Rocker shaft 13 is prevented from axial shifting relative to brackets 14. Lever arms 12 may be resilient bars or flat springs. Crank 17 is rigidly fixed to rocker shaft 13 and is operatively connected to link 18 engaged by hand lever 19 fulcrumed at 20 to a suitable portion of vehicle 16, so that it can be conveniently acted upon by the operator of the vehicle. Rollers 10 are rotatable and positionable by the described rigging behind the vehicle wheels 20 which are shown to be the rear wheels of the vehicle 16 and which wheels are provided with suitable tires 21 having treads 22.

Under normal operating conditions of the vehicle under which the device is non-operative, as shown in Figure 1 in dot and dash lines, hand lever 19 and levers 12 are in such positions that roller 10 does engage neither the wheel-tires 21 nor the road. Suitable lifting and locking means such as pawls and ratchets, not shown, are provided to hold the rollers 10 in the dotted, non-operative position, and also in their effective positions.

Figure 2:
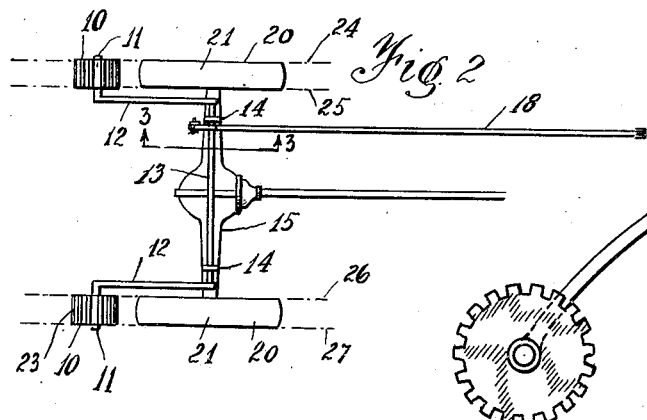
Figure 2 is a plan view of the device mounted upon the rear axle of an automobile and showing part of the rigging.
Figure 3:
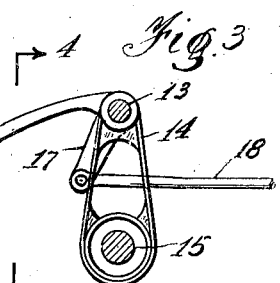
Figure 3 is a cross sectional view taken on line 3—3 in Figure 2.
Figure 4:
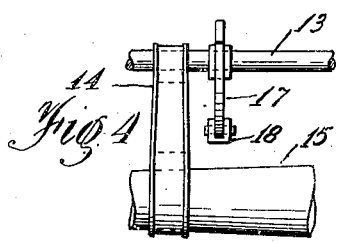
Figure 4 is a partial elevational view of the rigging, shown to a somewhat larger scale, as viewed from line 4—4 in Figure 3.
Figure 5:
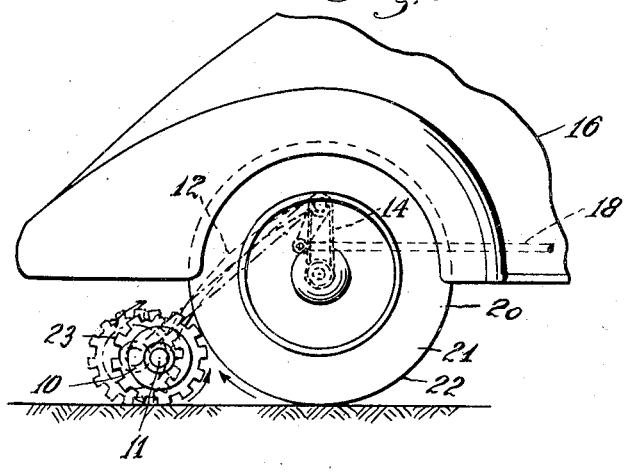
Figure 5 is a side elevational view, to a larger scale, of the device with part of the rigging shown.

Rollers 10 are provided with friction-increasing treads 23 coacting first with the treads 22 of the tires 21 and then with the road. As best seen in Figure 2 the displacement of the drag members, or rollers 10, by the rigging and positioning means, is effected substantially within the space bordered by vertical planes 24, 25, 26 and 27 being tangential to the sides of the tires 21 of vehicle wheels 20 and indicated by dot and dash lines in Figure 2.

The device operates as follows:

When the driver releases the locking means and pulls the hand lever 19 in the direction of the arrow, the rigging, through link 18, crank 17 and rocker shaft 13, swings levers 12 and the rollers 10 carried thereon towards tires 21 of the wheels 20 and toward the road. The length and shape of resilient levers 12 is such that the tread 23 of rollers 10 will first contact the treads 22 of tires 21 and will be set in rotary motion thereby. As the rotation of the tires is clockwise, upon contact with them, rollers 10 will be set into counter clockwise rotary motion as shown by the single headed arrows. In this position treads 23 of rollers 10 will exert a cleaning effect upon the treads 22 of tires 21 sweeping away mud, ice or snow from the latter and increasing thereby their frictional coefficient with the ground. This cleaning effect of the treads of the tires will be in many cases already sufficient to arrest skidding or prevent the sliding of one wheel turning without gripping (while the other wheel stands still due to the action of the differential mechanism of the vehicle). Further pulling on the hand lever 19 presses rollers 10 against the road and due to the resiliency of lever 12 the distance between the centers of rollers 10 and those of the wheels 20 will be somewhat increased and their frictional contact with the tires relieved (though they still will exercise a superficial cleaning action upon treads 22 of tires 21) and they become frictionally engaged with the road and rotated in clockwise direction as shown by the double headed arrow. While rollers 10 are rotated according to the displacement of the vehicle 16 in the direction of the travel they are not rotatable through the lateral displacement of the wheels on the road, hence, they have to be dragged together with the wheels 21 against their sliding frictional resistance on the road. The treads 23 on rollers 10 are protruding sufficiently to cause considerable frictional resistance under the pressure exerted by the rigging of suitable dimensions to give ample advantage to the manual force for producing the necessary pressure on rollers 10 toward the road.

It is obvious that the positioning of rollers 10 may be brought about by pneumatic, electric or hydraulic prime movers or intensifiers instead of purely manual operation in which cases the operator would have to control the power furnished by these means and the rigging would have to be changed accordingly which is only a matter of skill.

It is also obvious that by suitable changes in the rigging rollers 10 may be applied not only behind but also in the front of the wheels and in equal numbers with any number of wheels of the vehicle including those which are used for steering.

From the foregoing description it is evident that I have provided a device which will prevent or arrest the skidding and sliding of motor vehicles and while I have described one preferred construction of the device I do not intend to be limited by this exemplary embodiment, but what I claim as new and intend to secure by Letters Patent are devices which fall within the spirit and the scope of the appended claims.

1. In a motor vehicle, a friction increasing device, comprising rubber cylinders having friction increasing treads on their periphery, rigging means including resilient levers mounting said members rotatably and for displacements substantially within the spaces bounded by vertical planes tangential to the sides of the tires of the wheels of said vehicle and positioning means for placing and holding said cylinders selectively in noneffective and effective positions, respectively, with suitable force in which effective positions said cylinders first contact the treads of the tires of said vehicle and afterwards the road upon which said vehicle travels, a rocker shaft oscillatably mounted on brackets rigidly fixed to the rear axle of said vehicle, said lever arms being rigidly fixed to said rocker shaft, a crank arm rigidly fixed to said rocker shaft, said positioning means include a link and a hand lever operatively connected to said crank lever.

2. In a motor vehicle, a frictional increasing device, comprising rubber cylinders having friction increasing treads on their periphery, rigging means including resilient levers mounting said members rotatably and for displacements substantially within the spaces bounded by vertical planes tangential to the sides of the tires of the wheels of said vehicle and positioning means for placing and holding said cylinders selectively in noneffective and effective positions, respectively, with suitable force in which effective positions said cylinders first contact the treads of the tires of said vehicle and afterwards the road upon which said vehicle travels, said resilient lever arms consist of substantially a flat spring and in which the rigging means include a rocker shaft oscillatably mounted on brackets rigidly fixed to the rear axle of said vehicle, said lever arms being rigidly fixed to said rocker shaft, and said positioning means include a link and a hand lever operatively connected to said crank lever.

CHARLES A. FEATHER.

REFERENCES CITED

The following references are of record in the file of this patent:

UNITED STATES PATENTS

| Number | Name | Date |
|---|---|---|
| 1,190,542 | Grand Bois | July 11, 1916 |
| 1,429,771 | Raymond | Sept. 19, 1922 |
| 2,168,440 | Dole | Aug. 8, 1939 |
| 2,273,937 | Coate | Feb. 24, 1942 |

FOREIGN PATENTS

| Number | Country | Date |
|---|---|---|
| 109,223 | Switzerland | May 1, 1925 |